United States Patent
Kunze et al.

(10) Patent No.: US 12,288,091 B2
(45) Date of Patent: Apr. 29, 2025

(54) METHODS AND APPARATUS FOR CONTEXT SWITCHING

(71) Applicant: Arm Limited, Cambridge (GB)

(72) Inventors: Eric Kunze, Santa Clara, CA (US); Jared Corey Smolens, Santa Clara, CA (US); Aaron DeBattista, Cambridge (GB); Elliot Maurice Simon Rosemarine, London (GB)

(73) Assignee: Arm Limited, Cambridge (GB)

( * ) Notice: Subject to any disclaimer, the term of this patent is extended or adjusted under 35 U.S.C. 154(b) by 893 days.

(21) Appl. No.: 17/474,568

(22) Filed: Sep. 14, 2021

(65) Prior Publication Data

US 2023/0084603 A1    Mar. 16, 2023

(51) Int. Cl.
  *G06F 9/46*    (2006.01)
  *G06F 9/38*    (2018.01)
  *G06F 9/448*   (2018.01)
  *G06F 9/48*    (2006.01)

(52) U.S. Cl.
  CPC ............ *G06F 9/461* (2013.01); *G06F 9/3812* (2013.01); *G06F 9/3851* (2013.01); *G06F 9/4484* (2018.02); *G06F 9/485* (2013.01)

(58) Field of Classification Search
  CPC ...... G06F 9/461; G06F 9/4484; G06F 9/3812; G06F 9/3851; G06F 9/485
  See application file for complete search history.

(56) References Cited

U.S. PATENT DOCUMENTS

| | | | | |
|---|---|---|---|---|
| 2011/0117871 | A1* | 5/2011 | Hu ........................ | H04B 1/0003 455/334 |
| 2014/0022266 | A1* | 1/2014 | Metz ...................... | G06F 9/461 345/522 |
| 2015/0070369 | A1* | 3/2015 | Frascati .................... | G06T 1/20 345/539 |
| 2016/0140686 | A1* | 5/2016 | Lueh ...................... | G06F 9/462 345/522 |
| 2020/0250787 | A1* | 8/2020 | Cheng ................... | G06F 9/4881 |

* cited by examiner

*Primary Examiner* — Tammy E Lee
(74) *Attorney, Agent, or Firm* — NIXON & VANDERHYE P.C.

(57) ABSTRACT

Aspects of the present disclosure relate to apparatus comprising execution circuitry comprising at least one execution unit to execute program instructions, and control circuitry. The control circuitry receives a stream of processing instructions, and issues each received instruction to one of said at least one execution unit. Responsive to determining that a first type of context switch is to be performed from an initial context to a new context, issuing continues until a pre-emption point in the stream of processing instructions is reached. Responsive to reaching the pre-emption point, state information is stored, and the new context is switched to. Responsive to determining that a context switch is to be performed to return from the new context to the initial context, the processing status is restored from the state information, and the stream of processing instructions is continued.

17 Claims, 7 Drawing Sheets

METHODS AND APPARATUS FOR CONTEXT SWITCHING

BACKGROUND

The present technique relates to the field of processing circuitry, and specifically to processing contexts and the switching therebetween.

At a given time, a processor can be considered to be executing processing instructions within a given context. For example, the context may be a particular processing task such as a process or thread. It may be desired to switch between such contexts. For example, the context may be switched when all processing instructions associated with the current context have been executed, such that the processing task has finished. It may also be desirable to switch contexts at other times, such that a processing task is paused, a different task is performed, and then the original processing task is resumed.

Such context switches may be performed as part of a multitasking operation, in which several tasks are performed simultaneously. Context switches may also be performed in response to an interrupt, for example to process an input from a peripheral before returning to a previous task.

Context switches can be a source of inefficiencies in processor operation. There is therefore a desire for improved methods of handling context switching.

SUMMARY

At least some examples provide an apparatus comprising:
execution circuitry comprising at least one execution unit to execute program instructions; and
control circuitry to:
  receive a stream of processing instructions; and
  issue each received instruction to one of said at least one execution unit,
  responsive to determining that a first type of context switch is to be performed from an initial context to a new context:
    continue issuing received instructions until a pre-emption point in the stream of processing instructions is reached; and
    responsive to reaching the pre-emption point:
      store state information associated with a current status of processing the stream of processing instructions; and
      switch to the new context, and
  responsive to determining that a context switch is to be performed to return from the new context to the initial context:
    restore the processing status from the state information; and continue issuing the stream of processing instructions.

Further aspects provide a method comprising:
receiving computer code;
compiling said computer code into processing instructions for execution, wherein said compiling comprises:
  determining a series of processing instructions corresponding to the computer code;
  identifying a plurality of pre-emption points in the series of processing instructions, each pre-emption point representing a point in the stream of processing instructions with an expected associated state information having a size below an average state information size; and
  inserting a plurality of pre-emption tags into the series of processing instructions, each pre-emption tag identifying a location of a corresponding pre-emption point, and outputting the series of processing instructions, including said tags.

Further examples provide a method comprising:
receiving a stream of processing instructions;
issuing each received instruction to an execution unit;
responsive to determining that a first type of context switch is to be performed from an initial context to a new context:
  continuing issuing received instructions until a pre-emption point in the stream of processing instructions is reached; and
responsive to reaching the pre-emption point:
  storing state information associated with a current status of processing the stream of processing instructions; and
  switching to the new context.

Further aspects, features and advantages of the present technique will be apparent from the following description of examples, which is to be read in conjunction with the accompanying drawings.

DESCRIPTION OF EXAMPLES

In an example, an apparatus (for example a processing apparatus such as a central processing unit or graphics processing unit) comprises execution circuitry and control circuitry. The execution circuitry comprises at least one execution unit to execute program instructions.

The control circuitry is configured to receive a stream of processing instructions, and issue each received instruction to one of said at least one execution unit. The processing instructions may for example be received from a storage such as a memory or cache.

The control circuitry is configured to determine that a first type of context switch is to be performed from an initial (i.e. current) context to a new context. For example, the initial context may be associated with a first processing task whilst the new context is associated with a second, higher priority, processing task. The control circuitry may determine that the context switch is to be performed based on a received context switch command. Such a command may be received from a host.

Responsive to this determination, the control circuitry continues issuing received instructions (i.e. associated with the initial context) until a pre-emption point in the stream of processing instructions is reached. The pre-emption point, which may be efficiently identified by a pre-emption tag in the stream of processing instructions, identifies a suitable point for the context switch to be performed. For example, a current state of processing may be expressible by way of state information. Such state information provides a sufficiently complete description of the current state that it can be used to restore that state at a later time (e.g. after a context has been switched, and later switched back). The pre-emption tag may identify a point in the stream of processing instructions with associated state information having a size below an average state information size, or below a particular size threshold.

Responsive to reaching the pre-emption point, the control circuitry stores the aforementioned state information associated with a current status of processing the stream of processing instructions. The apparatus itself may comprise a storage in which the state information is stored. This provides an efficient way of storing the state information for quick and low-latency retrieval. Alternatively, the state information may be stored in an external storage such as a memory or cache.

The control circuitry then switches to the new context, for example by ceasing execution of the first processing task (associated with the initial context) and commencing execution of the second processing task (associated with the new context).

At a later time, the control circuitry determines that a context switch is to be performed to return from the new context to the initial context. For example the aforementioned second processing task may be completed, or it may be determined that the initial context now has a higher priority than the new context. Responsive to this determination, the control circuitry restores the processing state from the state information and continues issuing the (initial) stream of processing instructions.

This provides an efficient way of performing context switching: the use of pre-emption points means that the average size of the stored context information can be reduced, as the context switch will be delayed until it is relatively small (i.e. at the pre-emption point). This reduces the processing resources consumed during the storing and restoring of the context information, and also reduces the latency associated with storing and restoring the initial context. System performance is thereby improved. As described in more detail below, the positioning of pre-emption points can be optimised. If stricter requirements for placing a pre-emption point are imposed, a smaller expected size of context information is achieved, at the expense of a potentially longer expected time to continue in the initial context because fewer pre-emption points are placed. Conversely, if looser requirements are imposed such that more pre-emption points are placed, the expected time to continue in the initial context can be reduced, at the expense of some of the pre-emption points being less-optimally-placed such that the average expected context information size is larger. In any of these examples, a minimum frequency of pre-emption points may be enforced This is particularly advantageous for neural processing units, which implement neural nets, because such processors may have a relatively large amount of context information. Reducing the size of such context information can thus significantly reduce the processing resources associated with context switching.

In an example, the state information comprises the minimum amount of information to fully represent the current state. This reduces the overall size of the state information. It may comprise at least one of any active data associated with the initial context, and a current state of the control circuitry.

In an example, the control circuitry is stored as a state vector. This provides an efficient way of storing the state information.

The above examples relate to the aforementioned first type of context switch, which is based on pre-emption points. The apparatus may also be configured to perform other types of context switch.

In an example, the control circuitry is configured to determine that a second type of context switch is to be performed. The control circuitry is responsive to this determination to abort the issuing of the stream of processing instructions, and switch to the new context. At a later time, responsive to determining that a context switch is to be performed to return from the new context to the initial context, the control circuitry resumes issuing the stream of processing instructions. This resuming of issuing starts at an instruction corresponding to a safe restart point.

The second type of context switch can be performed very quickly with low latency, as there is no wait for a pre-emption point and no context information is stored. It can thus be performed immediately following a determination that the switch is to be performed. The latency of performing the switch is thus lower than the first type, and is also more predictable (whereas the latency of performing the first type depends on the time until a pre-emption point is reached). However, the time to perform the switch back to the initial context is unpredictable, as it depends how far back in the program flow is the last safe restart point. It is also, on average, potentially longer than the time to perform such a switch back following a context switch of the first type, as safe restart points may be less frequent than suitable pre-emption points.

The safe restart point is a point from which program flow can be safely restarted despite no context information having been stored. It may for example correspond to a point having no pending processing results, corresponding to the stream, to be output to a storage: program flow can be restarted from such a point without any context information other than the location of the point. Such a point having no pending processing results may correspond to the end of a processing subtask.

Safe restart points may be efficiently identified in the stream of instructions by way of compiler annotations, which are inserted by the compiler to identify them for use by the control circuitry.

Alternatively or additionally, the control circuitry may be configured to determine that a third type of context switch is to be performed from the initial context to the new context. In response to such a determination, the control circuitry continues issuing received instructions until a current processing subtask is completed. Responsive to completing the current subtask, the control circuitry stores state information associated with a current status of processing the stream of processing instructions, and switches to the new context. At a later time, the control circuitry is responsive to determining that a context switch is to be performed to return from the new context to the initial context to restore the processing status from the state information, and continue issuing the stream of processing instructions.

The third type of context switch is quick to initiate in terms of latency, but the time to execute it is non-deterministic depending on the size of the context information that is to be stored. For example, the context information may include regions of memory (e.g. static random access memory, SRAM) which will be used when restoring the initial context.

Three context switch types have thus been described. In some example, more than one of these (e.g. types 1 and 2, or 1 and 3, or 1 to 3) may be implemented by the apparatus. The control circuitry may determine which type to perform based on a relative priority of the initial context and the new context. For example, a higher-priority context switch may use the second type, whereas a lower-priority switch uses the first type, and/or a middle-priority switch uses the third type.

Similarly, the type of context switch to be used may be determined based on a magnitude of a difference between priority values of the initial context and the new context. For example, a more disruptive type (e.g. the second type) may be used if the new context has a significantly higher priority than the initial context (e.g. if the difference in priority values exceeds a threshold), but a less disruptive type (e.g. the first type) may be used if the new context has a priority that is only slightly higher than the initial context (e.g. if the difference in priority values is less than a threshold).

Alternatively or additionally, the type of context switch to be used may be determined based on an expected time to completion of the initial context and/or an expected execution time of the new context. For example, a more disruptive method could be used if the initial context has relatively long to run whereas the new context is expected to be relatively brief. The above-described criteria for determining which type of context switch to use may be combined. In other words, relative priority and context completion time may be simultaneously taken into account, such that for example the relative priorities and also the relative expected completion times can each weight the decision towards a more or less disruptive context switch type.

In an example in which the priorities of the initial context and the new context are taken into account when determining which type of context switch to use, the priorities may be changed over time prior to the context being switched. For example, responsive to a time period passing without the context switch being performed, the priority of the new context may be increased (or, equivalently, the priority of the initial context may be decreased). In this manner, even if the first context type is initially selected, if sufficient time passes without a pre-emption point being reached then a more disruptive context switch method may ultimately be used. This helps to ensure that the switch to the new context will not be delayed for an arbitrarily long time, even if it originally had a relatively low priority. This also provides a safeguard against code which has no defined pre-emption points, for example because it was maliciously written to prevent context switches to other processes.

The above-described examples relate to the apparatus which executes computer program instructions. A method will now be described for compiling such computer program instructions, for example for execution by an apparatus according to one of the above-described examples.

In this method, computer code is received. The code is then compiled into processing instructions for execution.

This compiling comprises determining a series of processing instructions corresponding to the computer code, and identifying a plurality of pre-emption points in the series of processing instructions. Each pre-emption point represents a point in the stream of processing instructions with an expected associated state information having a size below an average state information size. A plurality of pre-emption tags is inserted into the series of processing instructions, each pre-emption tag identifying a location of a corresponding pre-emption point. As explained above, the frequency of pre-emption points may be selected as a trade-off between the distance between the points and the expected state information size associated with each point.

The series of processing instructions, including said tags, is then output, for example to a storage for provision to the above-described apparatus.

As explained above, the frequency of pre-emption points may be selected as a trade-off between the distance between the points and the expected state information size associated with each point. For example, the plurality of pre-emption points may be identified based on a simultaneous optimisation of an expected state information size associated with each pre-emption point, and a number of processing instructions between consecutive pairs of pre-emption points.

Examples of the present disclosure will now be described with reference to the drawings.

Figure 1A:
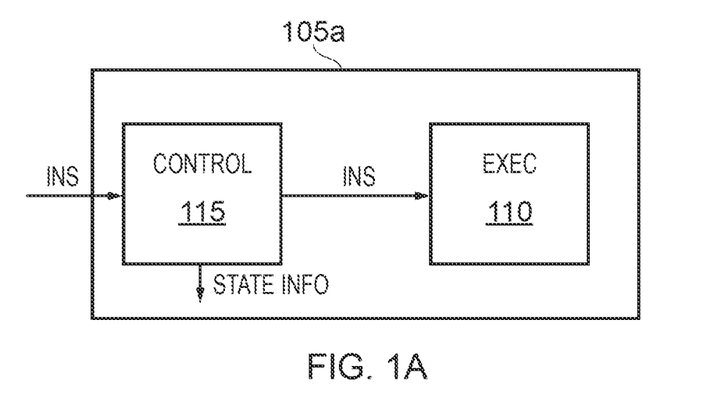
FIGS. 1A and 1B depict apparatuses according to examples.

FIG. 1A schematically shows an apparatus 105a according to an example of the present disclosure. The apparatus 105 comprises an execution unit 110 which is configured to execute program instructions. The apparatus 105 also comprises a control unit 115 which is configured to receive processing instructions and issue each received instruction to the execution unit 110 for execution. The control unit is also configured to store state information, as will be described in more detail below.

Figure 1B:
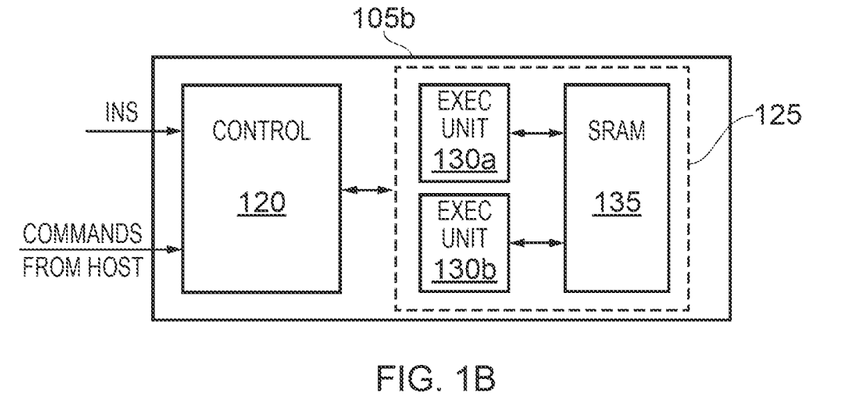

FIG. 1B schematically shows an apparatus 105b according to an example of the present disclosure. The apparatus 105b may be considered as a more detailed version of the apparatus 105a, or as an alternative apparatus.

Apparatus 105b comprises a control unit 120. The control unit 120 can receive processing instructions, for example from a fetch unit. For example, the apparatus 105b may form part of a processing pipeline. The control unit 120 can also receive operational commands from a host, for example to control or modify the operation of the control circuitry 120.

Apparatus 105b further comprises an execution block 125. The execution block comprises execution units 130a, 130b which are configured to receive processing instructions from the control unit 120 and execute them. The execution units 130a, 130b may be general execution units which can execute many or all instruction types, or dedicated execution units which each execute particular instruction types. The provision of multiple execution units 130a, 130b allows multiple instructions to be executed in parallel. In general, an arbitrarily large number of execution units may be provided.

The execution block 125 also comprises static random access memory (SRAM) 135 which the execution units 130a, 130b can utilise as part of the execution of their respective instructions. For example, results of calculations may be stored in the SRAM 135.

The various components of apparatuses 105a, 105b may be implemented as dedicated hardware such as circuitry which forms part of a processing pipeline. Alternatively, one or more of the components may be implemented within general-purpose circuitry, such as software executed by a processor. The apparatuses 105a, 105b may comprise or form part of neural processing units which are configured to implement neural networks.

Figure 2:
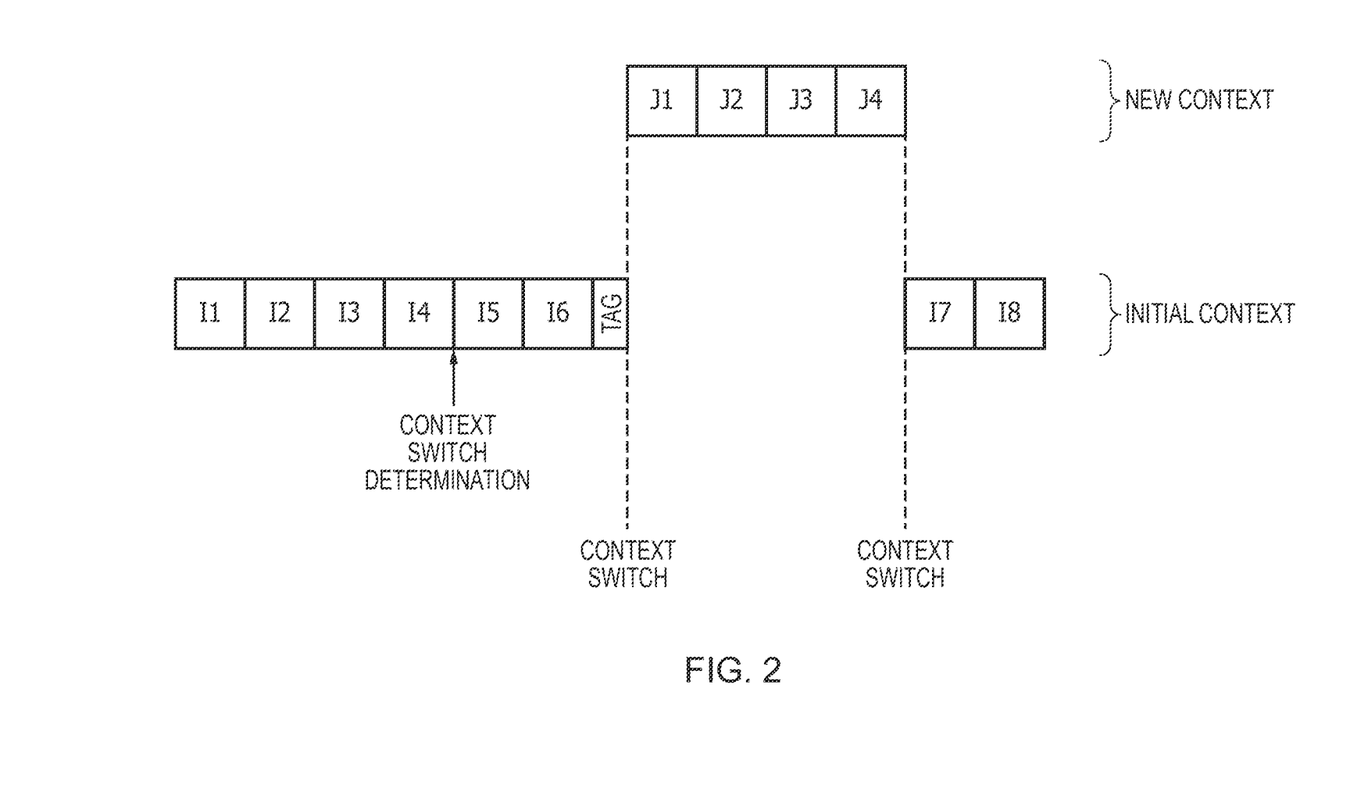
FIGS. 2 to 4 illustrate different types of context switching process, according to examples.

A given stream of processing instructions, executed for example by the apparatus 105a, 105b of FIGS. 1A and 1B, may be associated with a particular context. It may be desired to switch to a different context. For example, if an interrupt is issued to the control circuitry (e.g. in response to an input from a peripheral), the control circuitry may switch to a new context to process the interrupt, after which the context can switch back to the initial context. FIG. 2 illustrates one type of context switch process for performing such a context switch.

In FIG. 2, instructions I1, I2, I3, . . . are associated with an initial context. These instructions are issued, by a control unit, to one or more execution units. After instruction I4, it is determined that the context is to be switched to a new context (for example to process an interrupt). The determination may be responsive to a context switch command received from a host. However, the context is not immediately switched.

Instructions are continued to be issued within the initial context. Following instruction I6, a pre-emption tag is detected. This pre-emption tag indicates a suitable point for a context switch, because the processing state at that time can be expressed by state information having a relatively small size.

Following identification of the pre-emption tag, a context switch is performed to the new context. As part of the context switch, the aforementioned state information is stored, for example in dedicated storage of the apparatus or in general storage such as a memory or cache. The state information may include the contents of any regions of storage (e.g. within the SRAM 135 of FIG. 1B) which have active data, as well as the internal state of the control unit 115, 120. The control unit may maintain a SRAM state vector indicating such regions with active data at any given time. This may be a mask comprising bits, each of which is associated with one such region (for example 16 kb regions) and identifies whether it comprises active data.

Instructions J1 to J4 are executed within the new context.

Following instruction J4, it is desired to switch back to the initial context. For example, the processing task associated with the new context (e.g. the aforementioned interrupt) may have been completed, or a further context switch command may be received to switch back and forth between the contexts so that they are executed effectively in parallel.

The context is thus switched back to the initial context. As part of the switch, the processing state is restored from the stored state information, such that processing can continue from the point at which the context was switched away from the initial context. Instructions I7 and I8 are then issued to be executed.

The method thus allows the context switching process to be efficient (because of the reduced context information size), whilst still allowing context to be switched in the middle of a stream of processing instructions.

Figure 3:
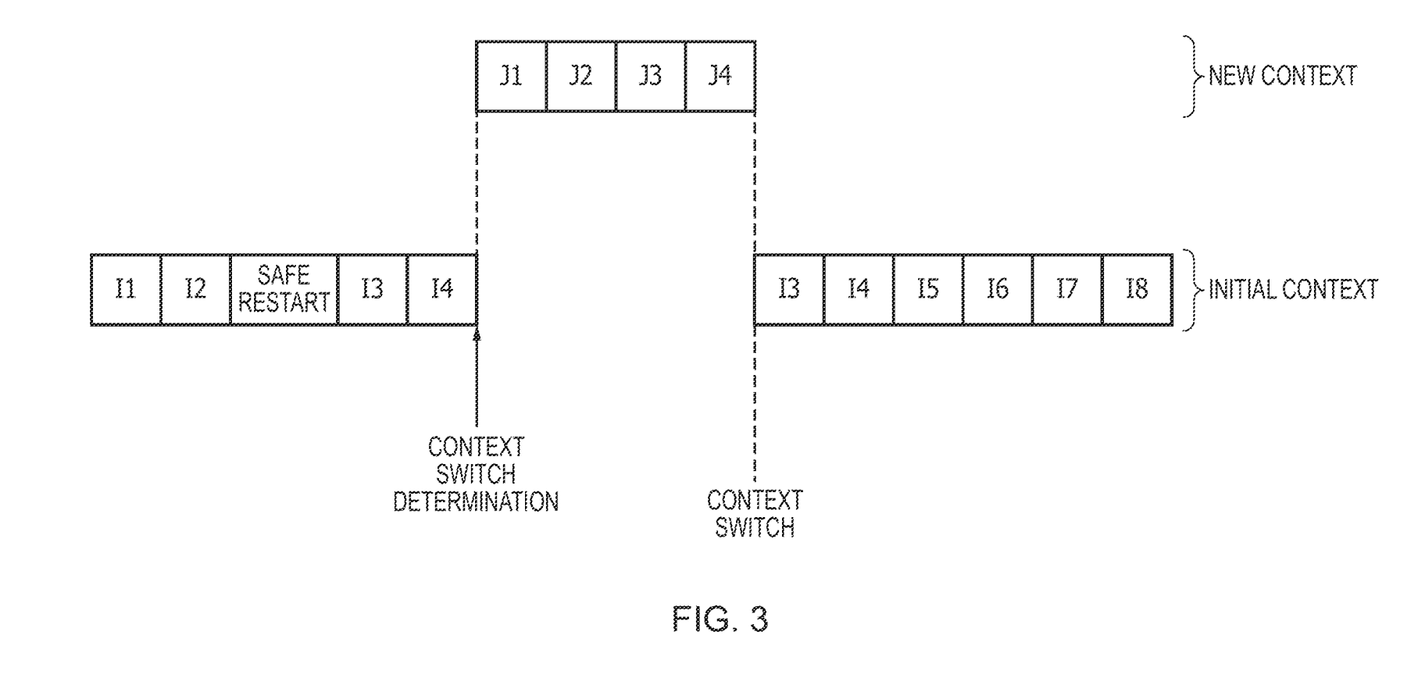

FIG. 3 illustrates a second type of context switching. This type may be implemented alternatively or additionally to the first type.

As for the first type (illustrated in FIG. 2), instructions I1, I2, I3, . . . are associated with an initial context. These instructions are issued, by a control unit, to one or more execution units.

After instruction I4, it is determined that the context is to be switched to a new context (for example to process an interrupt).

Unlike in FIG. 2, the context switch is immediately performed, and detailed state information (other than the position of the context switch within the instruction stream, i.e. "after I4") is not saved.

Instructions J1 to J4 are executed within the new context.

As for FIG. 2, following instruction J4, it is desired to switch back to the initial context. The context is thus switched back. However, the instruction stream is "rewound" back to a "safe restart" point. It can be seen that such a "safe restart" point is indicated following instruction I2, for example by a compiler annotation within the stream of instructions. This indicates a point from which the instruction flow can be safely restarted without any detailed context information. For example, it may represent a point at which all processing subtasks have been completed, with no outputs awaiting storage to memory.

The processing flow within the initial context can thus restart at instruction I3, and then continue.

The second context switch type thus allows the switch to be immediately performed, without taking any time to store context information or to wait for a suitable switching point. However, this comes at the cost of losing a non-deterministic amount of progress within the initial context. The second type may thus be implemented where the context switch is more urgent.

Figure 4:
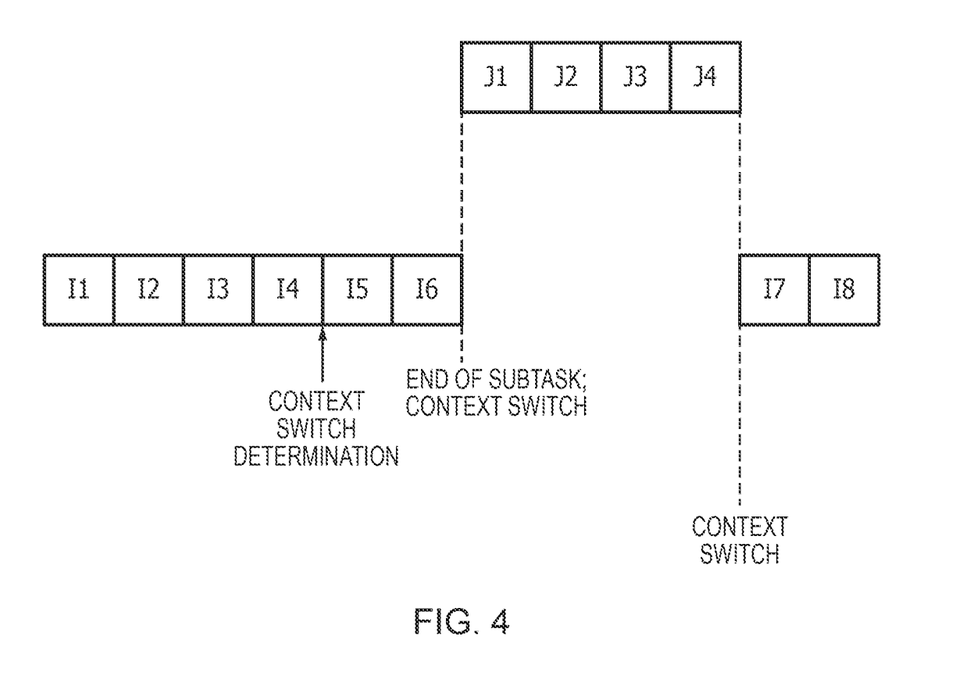

FIG. 4 illustrates a third type of context switching. This type may be implemented alternatively or additionally to the first and/or second type.

As for the first and second types, instructions I1, I2, I3, . . . are associated with an initial context. These instructions are issued, by a control unit, to one or more execution units.

After instruction I4, it is determined that the context is to be switched to a new context (for example to process an interrupt). However, the context is not immediately switched. Instructions continue to be issued and executed within the initial context. Following instruction I6, it is determined that a processing subtask has been completed. This can be considered a suitable point for a context switch. Context information, including the relevant contents of SRAM 135 (which stores the outputs of processing operations which have not been written to a storage such as a memory or cache), are saved, and the context is switched to the new context. The relevant contents may be identified by a SRAM state vector mask, which indicates the portions of SRAM which are currently used within the initial context.

Instructions J1 to J4 are executed within the new context.

Following instruction J4, it is desired to switch back to the initial context. The context is thus switched back to the initial context. As part of the switch, the processing state is restored from the stored state information, including the aforementioned SRAM contents, such that processing can continue from the point at which the context was switched away from the initial context. Instructions I7 and I8 are then issued to be executed.

The method thus allows the context switching process to be performed relatively promptly, but with a non-deterministic amount of time to store the SRAM contents (which may vary in size).

Figure 5:
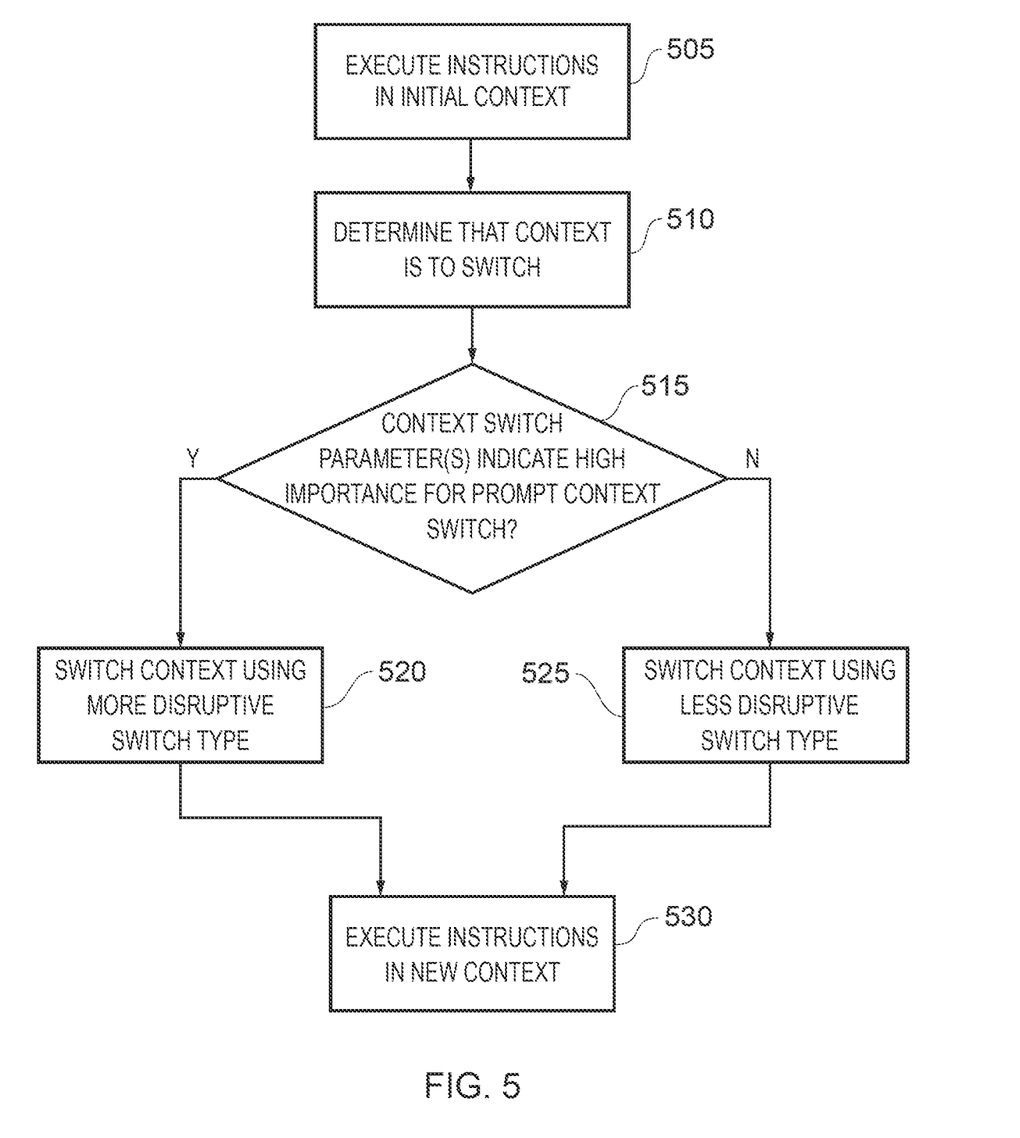
FIG. 5 illustrates a method for selecting between context switching types.

FIG. 5 illustrates a method for selecting between the context switching types such as those described above with reference to FIGS. 2 to 4.

At block 505, instructions are executed within an initial context.

At block 510, it is determined that a context switch is to be performed.

At block 515, it is determined whether context switch parameters indicate a high importance for a prompt context switch. For example, these parameters may include the relative priorities of the initial and new contexts. They may also include the expected execution durations of the new context and the remaining portion of the initial context. A single such parameter may be used, or multiple parameters. For example, a higher-priority new context may weight towards a prompt switch, whereas a long expected duration for the new context combined with a short expected remaining duration for the initial context weights against a prompt switch.

If it is determined that a prompt switch is to be performed, flow proceeds to block 520 where the context is switched using a more disruptive switch type such as the second type.

If it is determined that a prompt switch is not to be performed, flow proceeds to block 525 where the context is switched using a less disruptive switch type.

Regardless of which option is followed, once the context has been switched, flow proceeds to block 530 where instructions are executed in the new context.

Figure 6:
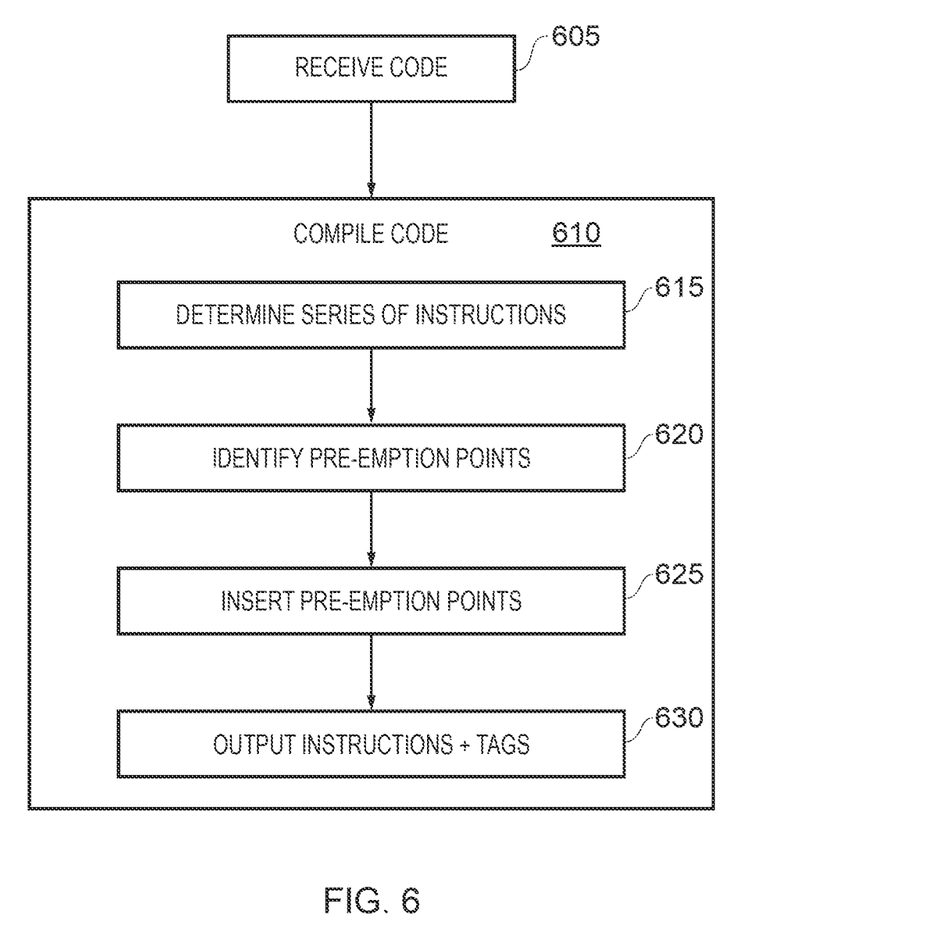
FIG. 6 shows a method of compiling code according to an example.

FIG. 6 illustrates a method for compiling code, according to an example of the present disclosure. The method may be performed by dedicated compiler circuitry, or by a software compiler operating on general-purpose processing circuitry.

At block 605, code to be compiled is received.

At block 610, the code is compiled. The compiling process comprises blocks 615 to 630, which may not necessarily be performed in the illustrated order.

At block 615, a series of instructions corresponding to the received code is determined.

At block 620, a plurality of pre-emption points within the instructions are identified. These are located at points that are expected to have associated state information with a size that is lower than average, or below a threshold. Alternatively or additionally, pre-emption points may be placed before large tasks, or before large amounts of memory are to be used.

In an example, where the instructions correspond to a model to be executed on a neural processing unit using a Static Scheduling model, the compiler schedules operators within a graph analysing an optimal way to execute the model lowering the execution into a series of memory and compute commands. Given such static scheduling, the compiler can know the expected state of the context at any given point within the instruction flow, and use this to identify suitable pre-emption points.

At block 625, pre-emption tags are inserted into the stream of instructions to identify the pre-emption points.

Finally, at block 630, the instructions (including the pre-emption tags) are output. They may be output directly to an apparatus such as apparatus 105 or 105b, or to a storage for later provision to such an apparatus for execution.

Figure 7:
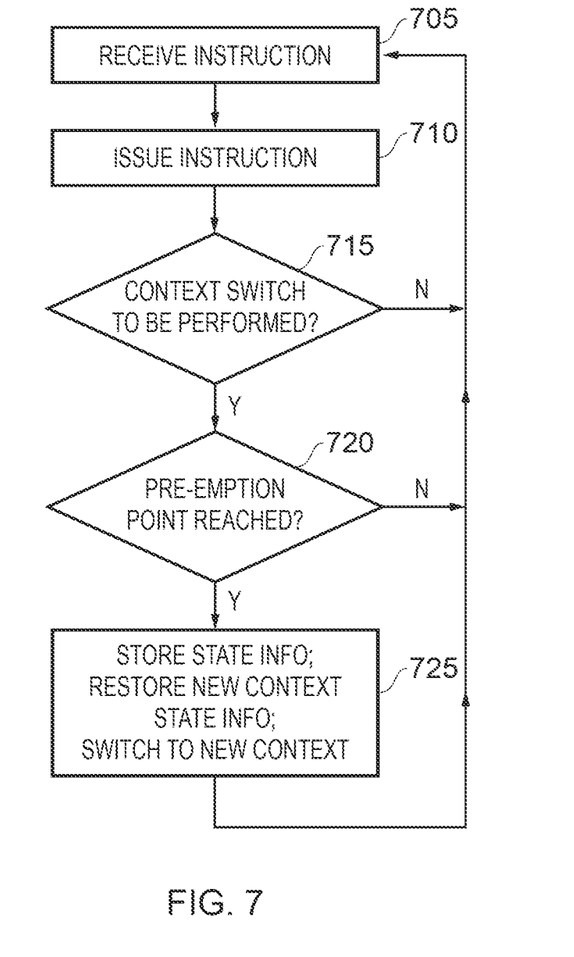
FIG. 7 illustrates a method according to an example.

FIG. 7 schematically illustrates a method according to an example of the present disclosure. The method may for example be performed by control circuitry within the apparatus 105a or 105b of FIGS. 1A and 1B.

At block 705, an instruction is received.

At block 710, the instruction is issued to an execution unit.

At block 715, it is determined whether a context switch is to be performed (for example in response to an interrupt). If not, flow returns to block 705. Otherwise, flow proceeds to block 720 where it is determined is a pre-emption point has been reached.

If a pre-emption point has not been reached, flow returns to block 705 such that instructions continue to be issued until a pre-emption point is reached.

If a pre-emption point has been reached, flow proceeds to block 725 where state information for the executing context is stored, state information for the new context is restored, and the context is switched to the new context.

Flow then finally returns to block 705, such that instructions continue to be received (and subsequently issued) within the context. This process can thus be repeated, for example to transition to a new context or to return to the initial context.

Apparatuses and methods are thus provided for switching between processing contexts From the above description it will be seen that the techniques described herein provides a number of significant benefits. In particular, the switching can be optimised based on a trade-off between the processing resources to perform the switching, and the latency associated with performing the switching.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An apparatus comprising:
   execution circuitry comprising at least one execution unit to execute program instructions; and
   control circuitry configured to:
     receive a stream of processing instructions of an initial context; and
     issue each received instruction to one of said at least one execution unit,
     responsive to determining that a first type of context switch is to be performed from the initial context to a new context:
       continue issuing received instructions until a pre-emption point in the stream of processing instructions is reached; and
       responsive to reaching the pre-emption point:
         store state information associated with a current status of processing the stream of processing instructions; and
         switch to the new context, and
     responsive to determining that a further context switch is to be performed to return from the new context to the initial context:
       restore the processing status from the state information; and
       continue issuing the stream of processing instructions, wherein the control circuitry is:
     responsive to determining that a second type of context switch is to be performed from the initial context to the new context to:
       abort the issuing of the stream of processing instructions; and
       switch to the new context,
     responsive to determining that the further context switch is to be performed subsequent to the second type of context switch to return from the new context to the initial context:
       to begin issuing the stream of processing instructions, starting at an instruction corresponding to a safe restart point, wherein the safe restart point is a point from which the stream of processing instructions can be safely restarted; and
     configured to determine whether to perform the first type of context switch or the second type of context switch based on a magnitude of a difference between priority values of the initial context and the new context.

2. An apparatus according to claim 1, wherein:
   the initial context is associated with a first processing task; and the new context is associated with a second processing task, the second processing task having a higher priority than the first processing task.

3. An apparatus according to claim 1, wherein the control circuitry is configured to identify said pre-emption point by a pre-emption tag in the stream of processing instructions.

4. An apparatus according to claim 3, wherein the pre-emption tag identifies a point in the stream of processing instructions with associated state information having a size below an average state information size.

5. An apparatus according to claim 1, wherein the state information comprises at least one of:
active data associated with the initial context; and
a current state of the control circuitry.

6. An apparatus according to claim 1, wherein the control circuitry is configured to store the state information as a state vector.

7. An apparatus according to claim 1, wherein the safe restart point corresponds to a point having no pending processing results, corresponding to the stream, to be output to a storage.

8. An apparatus according to claim 7, wherein the safe restart point is identified in the stream of instructions by a compiler annotation.

9. An apparatus according to claim 7, wherein the safe restart point corresponds to the end of a processing subtask.

10. An apparatus according to claim 1, wherein the control circuitry is configured to:
determine that the context switch is to be performed from the initial context to the new context; and
determine whether to perform the first type of context switch or the second type of context switch based on at least one of:
a relative priority of the initial context and the new context;
an expected time to completion of the initial context; and
an expected execution time of the new context.

11. An apparatus according to claim 1, wherein the control circuitry is configured to:
determine that the context switch is to be performed from the initial context to the new context;
determine a priority of the initial context;
determine a priority of the new context;
based on the difference between the priority of the new context and the priority of the initial context is less than a threshold, determine whether to perform the first type of context switch or the second type of context switch; and
responsive to a time period passing without the context switch being performed, increase the priority of the new context.

12. An apparatus according to claim 1, wherein the control circuitry is:
responsive to determining that a third type of context switch is to be performed from the initial context to the new context to:
continue issuing received instructions until a current processing subtask is completed; and
responsive to completing the current processing subtask:
store state information associated with a current status of processing the stream of processing instructions; and
switch to the new context, and responsive to determining that a context switch is to be performed to return from the new context to the initial context:
restore the processing status from the state information; and
continue issuing the stream of processing instructions.

13. An apparatus according to claim 12, wherein the control circuitry is configured to:
determine that the context switch is to be performed from the initial context to the new context; and
determine whether to perform the first type of context switch or the third type of context switch based on at least one of:
a relative priority of the initial context and the new context;
the magnitude of the difference between priority values of the initial context and the new context;
an expected time to completion of the initial context; and
an expected execution time of the new context.

14. An apparatus according to claim 12, wherein the control circuitry is configured to:
determine that the context switch is to be performed from the initial context to the new context;
determine a priority of the initial context;
determine a priority of the new context;
based on the difference between the priority of the new context and the priority of the initial context is less than a threshold, determine whether to perform the first type of context switch or the third type of context switch; and
responsive to a time period passing without the context switch being performed, increase the priority of the new context.

15. An apparatus according to claim 1, comprising a storage, wherein the control circuitry is configured to store the state information in the storage.

16. An apparatus according to claim 1, wherein the control circuitry is configured to determine that the context switch is to be performed based on a received context switch command.

17. A method comprising:
receiving a stream of processing instructions of an initial context;
issuing each received instruction to an execution unit;
responsive to determining that a first type of context switch is to be performed from the initial context to a new context:
continuing issuing received instructions until a pre-emption point in the stream of processing instructions is reached; and
responsive to reaching the pre-emption point:
storing state information associated with a current status of processing the stream of processing instructions; and
switching to the new context; and
responsive to determining that a further context switch is to be performed returning from the new context to the initial context:
restoring the processing status from the state information; and
continuing issuing the stream of processing instructions, responsive to determining that a second type of context switch is to be performed from the initial context to the new context to:
aborting the issuing of the stream of processing instructions; and switching to the new context, responsive to determining that the further context switch is to be performed subsequent to the second type of context switch to return from the new context to the initial context:

beginning issuing the stream of processing instructions, starting at an instruction corresponding to a safe restart point, wherein the safe restart point is a point from which the stream of processing instructions can be safely restarted; and determining whether to perform the first type of context switch or the second type of context switch based on a magnitude of a difference between priority values of the initial context and the new context.

* * * * *